United States Patent
Perssson

(10) Patent No.: US 10,272,534 B2
(45) Date of Patent: Apr. 30, 2019

(54) GRINDING MACHINE WITH MOVABLE WATER TROUGH

(71) Applicant: Tormek AB, Lindesberg (SE)

(72) Inventor: Håkan Persson, Lindesberg (SE)

(73) Assignee: Tormek AB, Lindesberg (SE)

( * ) Notice: Subject to any disclaimer, the term of this patent is extended or adjusted under 35 U.S.C. 154(b) by 274 days.

(21) Appl. No.: 15/298,009

(22) Filed: Oct. 19, 2016

(65) Prior Publication Data

US 2017/0113317 A1    Apr. 27, 2017

(30) Foreign Application Priority Data

Oct. 21, 2015 (SE) ........................ 1551356

(51) Int. Cl.
| | | |
|---|---|---|
| *B24B 53/007* | (2006.01) | |
| *B24B 55/02* | (2006.01) | |
| *B23Q 11/10* | (2006.01) | |
| *B24B 3/36* | (2006.01) | |
| *B24B 27/02* | (2006.01) | |
| *B23Q 11/00* | (2006.01) | |
| *B24B 57/02* | (2006.01) | |

(52) U.S. Cl.
CPC ............ *B24B 3/36* (2013.01); *B23Q 11/0067* (2013.01); *B23Q 11/1007* (2013.01); *B24B 27/02* (2013.01); *B24B 53/007* (2013.01); *B24B 55/02* (2013.01); *B24B 57/02* (2013.01)

(58) Field of Classification Search
CPC ......... B24B 3/36; B24B 27/02; B24B 53/007; B24B 55/02; B24B 57/00; B24B 57/02; B23Q 11/0067; B23Q 11/1007
See application file for complete search history.

(56) References Cited

U.S. PATENT DOCUMENTS

| | | | | |
|---|---|---|---|---|
| 49,928 | A | * 9/1865 | Shillaber | .................. B24B 55/02 |
| | | | | 451/450 |
| 144,891 | A | 11/1873 | Cummings, Jr. | |
| 538,331 | A | * 4/1895 | Hyde | ...................... B24B 55/02 |
| | | | | 451/450 |

(Continued)

FOREIGN PATENT DOCUMENTS

| | | |
|---|---|---|
| DE | 1084109 B | 6/1990 |
| EP | 2660005 A2 | 11/2013 |

(Continued)

OTHER PUBLICATIONS

Notice of Allowance for Swedish Application No. 1551356-7, dated Apr. 29, 2016.

(Continued)

*Primary Examiner* — Timothy V Eley

(74) *Attorney, Agent, or Firm* — Merchant & Gould P.C.

(57) ABSTRACT

A grinding machine comprising a housing having a base for supporting the grinding machine, a shaft for holding a grindstone, a motor for rotating the shaft and a trough holder for holding a trough for grinding liquid, the through holder being arranged below the shaft, wherein the trough holder is movable in vertical direction between the base of the housing and the shaft for holding a grindstone and that the grinding machine comprises a lifting/lowering arrangement for moving the trough holder in said vertical direction.

10 Claims, 3 Drawing Sheets

(56) References Cited

U.S. PATENT DOCUMENTS

| | | | | |
|---|---|---|---|---|
| 570,110 A * | 10/1896 | Terry | ................ | B24B 55/02 |
| | | | | 451/450 |
| 665,380 A * | 1/1901 | Barnes | ............... | B24B 55/02 |
| | | | | 29/DIG. 76 |
| 844,497 A * | 2/1907 | Cheesbro | ........... | B24B 55/02 |
| | | | | 29/DIG. 74 |
| 1,569,757 A * | 1/1926 | King | .................. | B24B 27/02 |
| | | | | 29/DIG. 76 |
| 2,331,876 A * | 10/1943 | Walpole | ............. | B24B 55/06 |
| | | | | 29/DIG. 86 |
| 6,381,862 B1 * | 5/2002 | Doman | ............... | B24B 3/36 |
| | | | | 33/613 |
| 7,121,923 B1 | 10/2006 | Sweet | | |
| 2006/0163822 A1 | 7/2006 | Reyders | | |

FOREIGN PATENT DOCUMENTS

| | | |
|---|---|---|
| EP | 2883655 A1 | 6/2015 |
| GB | 2046145 A | 11/1980 |
| WO | WO 2007/098470 A2 | 8/2007 |

OTHER PUBLICATIONS

Search Report for European Patent Application No. 16193290.0, dated May 12, 2017.

* cited by examiner

GRINDING MACHINE WITH MOVABLE WATER TROUGH

This application claims benefit of Serial No. 1551356-7, filed 21 Oct. 2015 in Sweden, which application is incorporated herein by reference. To the extent appropriate, a claim of priority is made to each of the above disclosed application.

TECHNICAL FIELD

The present invention relates to a grinding machine comprising a movable holder for a trough for grinding liquid.

BACKGROUND ART

Grinding or sharpening of edged tools, such as handheld knives or wood working tools such as plane irons, wood chisels or spoke shave blades may be performed in a bench type grinding machine comprising a motor driven grindstone. During sharpening, the edged tool is held with a correct angle in contact with the grindstone and is moved across the grindstone by an operator until sufficiently sharpened. To remove particles produced during sharpening from the grindstone and to cool the edged tool, the grindstone is wetted with grinding liquid. For this purpose the grinding machine comprises a trough for the grinding liquid, typically water, arranged underneath the grindstone.

EP2883655A1 shows a grinding machine of the bench type having a trough for grinding liquid.

While the grinding machine of EP2883655A1 is robust and effective in use, it is rather cumbersome for a person using the grinding machine to mount the water trough prior to using the grinding machine. In order to mount the water trough it is necessary to push the water trough in position underneath the grindstone and then lift it up and hook it on to a holder in the housing of the grindstone. When the water trough contains grinding liquid, the mounting procedure may result in water spill on the workbench or onto the grinding machine. Removal of the water trough after use of the grinding machine is equally cumbersome. Therefore, the grindstone is occasionally left in contact with the liquid in the water trough at the end of the work day. This may cause excessive soaking of the grindstone and deterioration thereof.

Thus, it is an object of the present disclosure to provide an improved grinding machine which solves or at least alleviates one of the aforementioned problems. In particular it is an object of the present disclosure to provide a grinding machine which allows for simple mounting of the water trough.

SUMMARY OF THE INVENTION

According to the present disclosure at least one of these objects is achieved by a grinding machine 100 comprising a housing 1 having a base 2 for supporting the grinding machine, a shaft 3 for holding a grindstone 4, a motor for rotating the shaft 3 and a trough holder 10 for holding a trough 6 for grinding liquid, the through holder 10 being arranged below the shaft 3, characterized in that the trough holder 10 is movable in vertical direction between the base 2 of the housing 1 and the shaft 3 for holding a grindstone and that the grinding machine comprises a lifting/lowering arrangement 20 for moving the trough holder 10 in said vertical direction In the grinding machine according to the present disclosure mounting and dismounting of the trough holder is considerable simplified. In operation, the trough holder may be lowered to a mounting position where it is easy for the user of the machine to push a trough for grinding liquid on to the trough holder. The trough holder may thereafter, together with the through for grinding liquid, be raised by the lifting/lowering arrangement to a position for wetting a grindstone. At the end of the work day the trough holder may be lowered again such that the grindstone is free of contact with the grinding liquid.

A further advantage of the grinding machine according to the present disclosure is that it allows for simple use of grindstones with different diameters. It is easy to raise the trough holder to different heights in dependency of the diameter of the grindstone such that grindstones of both large and small diameter may be wetted. The same trough may thereby be used for grindstones of both large and small diameter.

Preferably, the lifting/lowering arrangement 20 comprises an actuator 21 having a first coupling means 24 and a second coupling means 25 arranged on the trough holder 10, wherein the coupling means 24, 25 are configured to couple the actuator 21 and the trough holder 10 such that actuation of the actuator 21 causes the trough holder 10 to move in vertical direction.

Preferably the first coupling means 24 and the second coupling means 25 comprises intermeshing gears. Intermeshing gears provides robust and controlled coupling, free of play, between the actuator and the trough holder.

Preferably, the first coupling means 24 is a gear wheel and the second coupling means 25 is a toothed rack 25. This type of coupling is easy to maneuver by the operator since turning of the actuator and thereby the rotation of gear wheel results in a corresponding linear displacement of the toothed rack and the trough holder. By appropriate design of the gear wheel and the toothed rack it is further possible to control the gearing ratio, i.e. the resulting vertical displacement of the trough holder in dependency of the degree of turning of the gear wheel.

Preferably, the trough holder 10 is configured to be guided in a vertical slot 5 in the housing 1 of the grinding machine, wherein the vertical slot 5 extends along an axis (X) extending from the base 2 of the grinding machine through the shaft 3 for holding a grindstone. Thereby is stable and secure movement of the trough holder ensured in vertical direction along the housing of the grinding machine.

Preferably, the trough holder 10 comprises at least one support arm 14 for supporting a trough 6 for grinding liquid extending from an external side surface 11 of the trough holder 10.

Preferably, the external side surface 11 of the trough holder 10 comprises a yoke 15, whereby a first support arm 14 extends from a first end of the yoke 15 and a second support arm 14 extends from a second end of the yoke 15. The yoke makes it possible to supporting a trough for grinding liquid in a simple and stable manner.

Preferably, the second coupling means 25 is arranged on an internal side surface 12 of the trough holder 10.

Preferably, the actuator 21 is an actuator shaft 21 having a first end 22 and a second end 23, wherein the first end 22 and the second end 23 are journalled in the housing 1 of the grinding machine, whereby the first end 22 of the actuator shaft 21 is arranged to be manually turned by an operator of the grinding machine and whereby the second end 23 of the actuator shaft 21 comprises said first coupling means 24.

Preferably, the grinding machine comprises a locking arrangement 40 for locking the actuator shaft 21 from rotating, wherein the locking arrangement comprises:

a locking sleeve 41, comprising at least one locking notch 42, and;

at least one locking tooth 43 arranged on the actuator shaft 21, wherein;

the locking sleeve 41 is attached to the housing 1 of the grinding machine and surrounds a portion of the actuator shaft 21, whereby the actuator shaft 21 is slidable in axial direction such that the at least one locking tooth 43 may engage and/or disengage the at least one locking notch 43 on the locking sleeve 41.

The locking arrangement 40 effective secures the trough for grinding liquid in a selected position.

DEFINITIONS

By "vertical direction" is meant a direction which is perpendicular to the base 2 of the grinding machine.

DETAILED DESCRIPTION OF EMBODIMENTS

The grinding machine according to the present disclosure will now be described more fully hereinafter. The grinding machine according to the present disclosure may however be embodied in many different forms and should not be construed as limited to the embodiment set forth herein. Rather, this embodiment is provided by way of example so that this disclosure will be thorough and complete, and will fully convey the scope of the present disclosure to those persons skilled in the art. Like reference numbers refer to like elements throughout the description.

Figure 1:
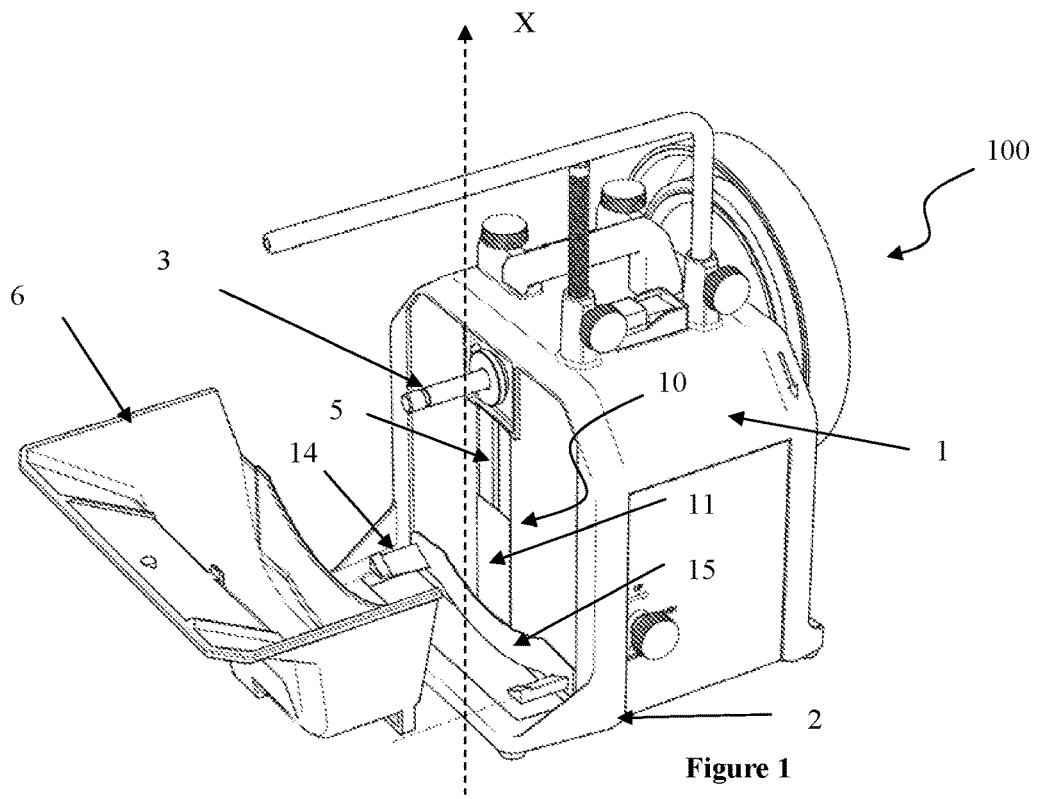
FIG. 1: A schematic drawing of a grinding machine according to the present disclosure.
Figure 5:
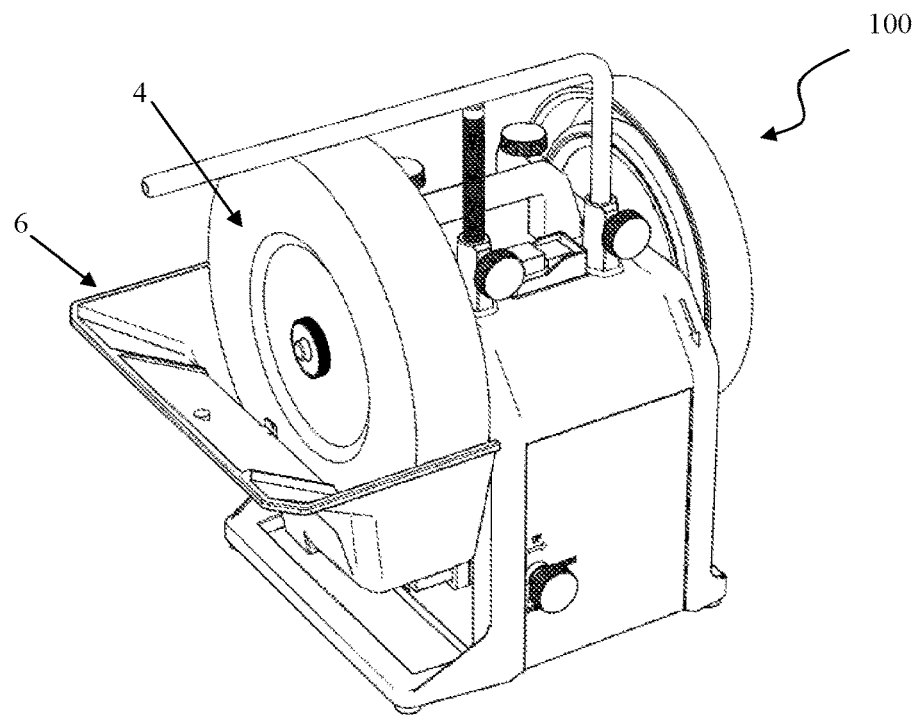
FIG. 5: A schematic drawing of a grinding machine according to the present disclosure with the trough in a raised position.
Figure 6:
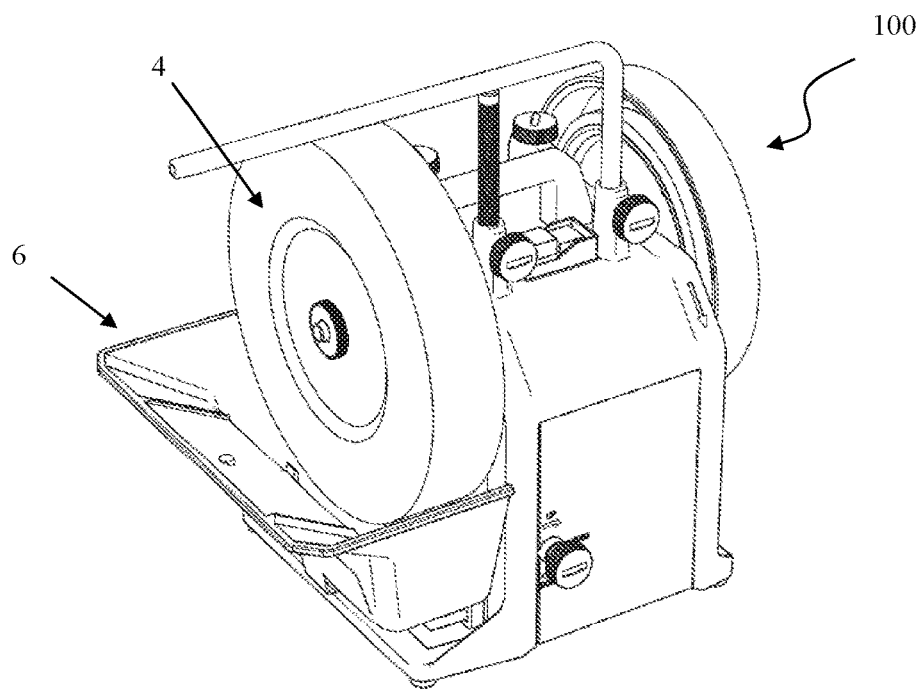
FIG. 6: A schematic drawing of a grinding machine according to the present disclosure with the trough in a lowered position.

FIG. 1 shows schematically a grinding machine 100 according to a first preferred embodiment of the invention in perspective front view. The grinding machine 100 is of the bench type, i.e. it is of a design that allows it to be placed on a table in a workshop and to be operated manually by a person. The grinding machine 100 comprises a housing 1. The housing has a plane base 2 on which the grinding machine is supported. The grinding machine comprises a shaft 3 which is rotated by an electrical motor (not shown) enclosed in the housing 1. The shaft 3 is provided to hold and rotate a grindstone against which blades are ground or sharpened. The grindstone is not shown in FIG. 1 for clarity reasons. However, FIGS. 2, 5 and 6 shows alternative views of the grinding machine of FIG. 1 with a grindstone 4 mounted on the shaft 3.

The grinding machine 100 comprises a trough holder 10 for holding a trough 6 for grinding liquid. In FIG. 1 the trough 6 has been removed from the grinding machine in order to make the parts of the trough holder 10 visible. Thus, the trough holder 10 comprises two support arms 14 which extend from an external side surface 11 of the trough holder 10, i.e. the side of the trough holder section that faces away from the housing 1. In FIG. 1, the external side surface 11 of the trough holder 10 comprises a yoke 15, whereby the two support arms 14 extend from a respective end of the yoke 15. In operation the trough 6 for grinding liquid is carried by, i.e. supported on the support arms 14. The trough holder 10 is arranged below, i.e. underneath the shaft 3.

According to one aspect of the present disclosure, the trough holder 10 is movable in vertical direction along the housing 1 of the grinding machine. The trough holder is thereby movable in at least a portion of the area between the base 2 and the shaft 3 for holding a grindstone. In the disclosed embodiment this achieved by guiding the trough holder 10 in a slot 5, e.g. a groove, which extends in vertical direction from the base 2 of the housing towards the shaft 3 for supporting the grindstone. Thus, the straight slot 5 is centered with respect to the shaft 3 for supporting the grindstone. As shown in FIG. 1, the trough holder 10 is thus movable in vertical direction along an axis (X) which extends from the base 2 of the housing through the shaft 3 for supporting the grindstone.

Figure 2:
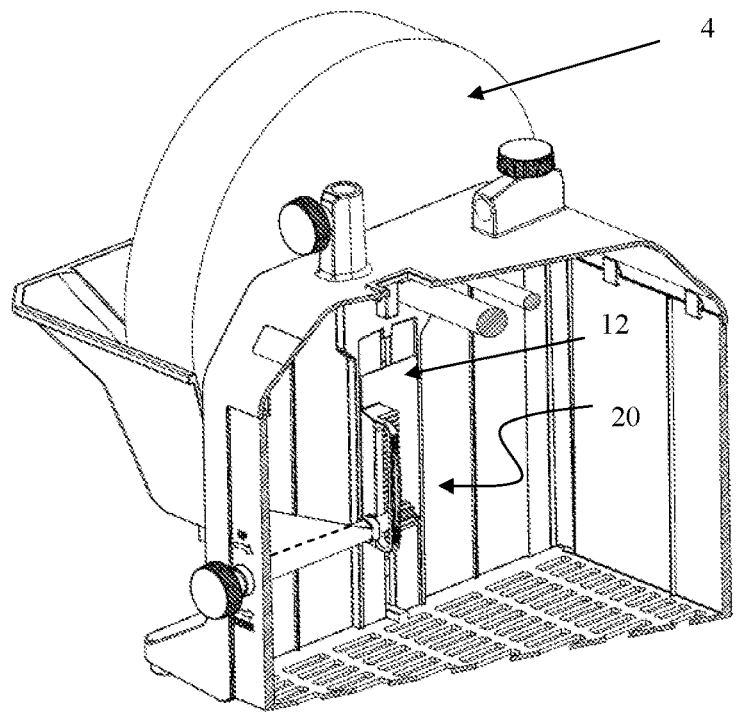
FIG. 2: A schematic drawing of a grinding machine according to the present disclosure in a cross-sectional view.

FIG. 2 is a cross-sectional view of the grinding machine 100 shown the interior of the housing 1 in the area behind the grindstone 4. FIG. 2 shows an internal side surface 12 of the trough holder 10. The internal side surface 12 of trough holder 10 is connected to the external side surface 11 of the trough holder 10 (shown in FIG. 1) through the slot by an intermediate piece (not shown). Thus, the trough holder 10 may slide along the slot 5 but is prevented from moving in any other direction.

According to a second aspect of the present disclosure, the grinding machine comprises a lifting/lowering arrangement 20 for moving the trough holder 10 along the housing 1 of the grinding machine. FIG. 2 shows a lifting/lowering arrangement 20 for moving the trough holder. The lifting/lowering arrangement is shown in detail in FIG. 3.

Figure 3:
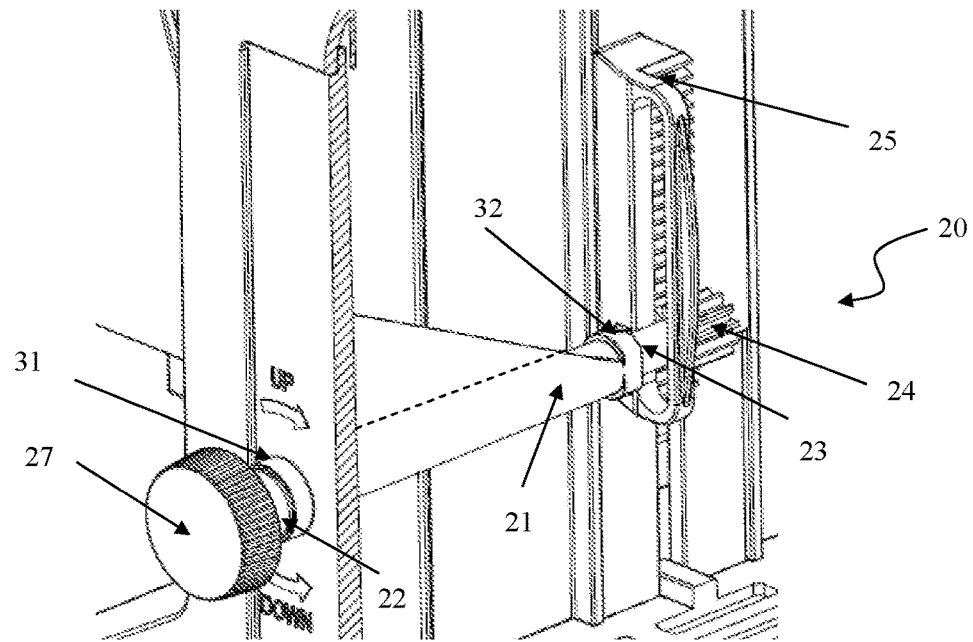
FIG. 3: A schematic drawing showing an enlargement of a portion of FIG. 2.

Thus, FIG. 3 shows a detailed view of the lifting/lowering arrangement 20 shown in FIG. 2. The lifting/lowering arrangement 20 comprises an actuator 21 in the form an actuator shaft 21 which has a first end 22 and a second end 23. The first end 22 and the second end 23 of the actuator 21 are journalled in a respective first and second attachment 31, 32 in the housing 1 of the grinding machine. The attachments 31, 32 may be bearings 31, 32, i.e. comprising circular openings for receiving the actuator 21. By journaling the actuator 21 in the first and the second attachment 31, 32 in the housing 1, the actuator 21 may be manually turned in clockwise/anticlockwise direction by an operator. To facilitate turning, the first end 22 of the actuator 21 extends to the outside of the housing 1 and may be provided with a knob 27.

The second end 23 of the actuator 21 comprises a first coupling means 24 in the form of a gear wheel.

The lifting/lowering arrangement 20 further comprises a second coupling means 25 in the form of a toothed rack. The second coupling means 25 is arranged on the internal side surface 12 of the trough holder 10. The second coupling means 25 is thereby fixed to the internal side surface 12 of the trough holder 10 and oriented such that it extends in vertical direction of the internal side surface 12 of the trough holder 10, i.e. parallel with the slot 5.

The first coupling means 24 on the actuator 21 and the second coupling means 25 on the internal side surface 12 of the trough holder 10 are configured such that they engage each other. Thus, the teeth of the gear wheel on the actuator shaft 21 are configured such that they engage the teeth of the toothed rack on the internal side surface 12 of the guiding section 11.

Thus, when the actuator shaft 21 is turned, the teeth on the gear wheel on the end of the actuator shaft 21 engages the teeth on the toothed rack and forces the trough holder 10 to move along the slot 5 in the housing 1. Clockwise turning of the actuator shaft 21 causes the trough holder 10 to move upwards, i.e. in direction towards the shaft 3 for holding a grindstone. Anti-clockwise turning of the actuator shaft 21 causes the trough holder 10 to move downwards, i.e. in direction towards the base 2 of the grinding machine.

The lifting lowering arrangement 20 may further comprise a locking arrangement 40 for locking the trough holder 10, and thus the trough 6 for grinding liquid, in position after turning of the actuator shaft.

Figure 4:
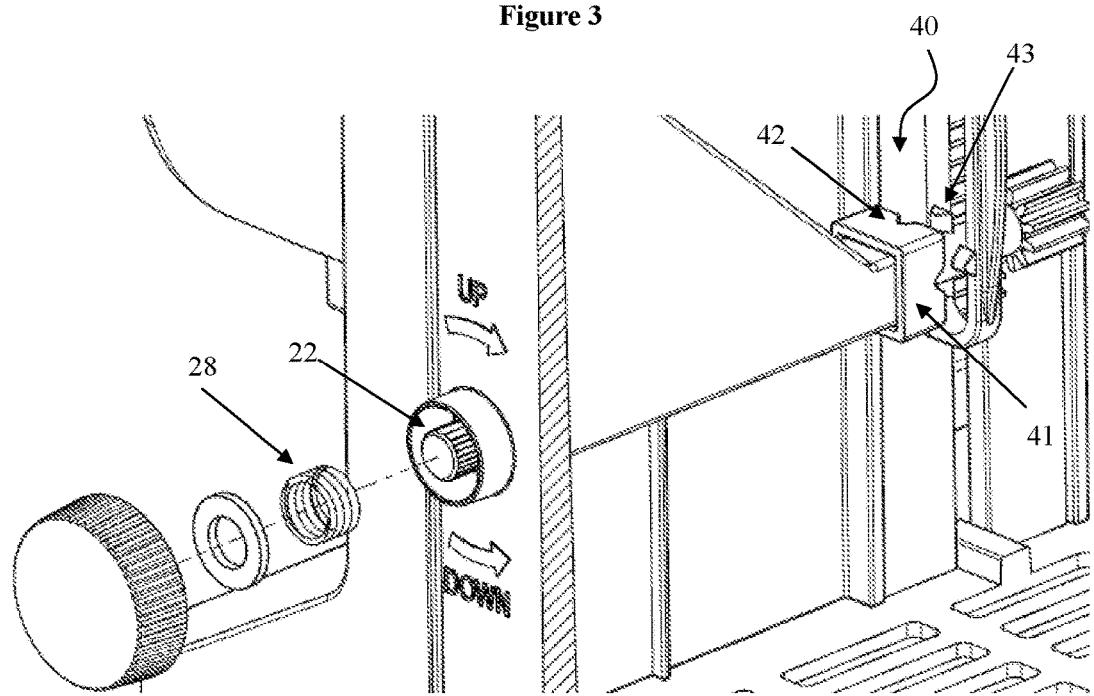
FIG. 4: A schematic drawing of a locking arrangement included in a grinding machine according to the present disclosure

FIG. 4 shows a closed-up view of a lifting/lowering arrangement 20 as described in FIG. 3 including a locking arrangement 40. The locking arrangement 40 comprises a locking sleeve 41 which is arranged around the second end 23 of the actuator shaft 21. The locking sleeve 41 is of quadratic cross-section, having four sides of which one side is attached to the housing 1 of the grinding machine. An end surface of the locking sleeve 41 is directed towards the coupling means 24 of the actuator shaft 21 and comprises locking notches 42. In FIG. 4, one locking notch 42 is provided on each side of the locking sleeve 41. However, it is possible to provide further locking notches over the locking sleeve. It is also possible that the locking sleeve is cylindrical.

The locking arrangement 40 further comprises locking teeth 43 which are arranged around the circumference of the second end 23 of the actuator shaft 21 and faces the end of the locking sleeve 41. The locking teeth 43 are dimensioned such that their size and shape correspond to the size and shape of the locking notches 42 in the locking sleeve 41.

The actuator shaft 21 is arranged slidable in axial direction such that the locking teeth 43 may be moved into and out of engagement with the locking notches 42 in the locking sleeve 41. Typically, the actuator shaft 21 is spring biased such that the locking teeth 43 on the actuator shaft 21 are forced by spring force in axial direction towards the locking sleeve 41. The locking arrangement 40 may thereby comprise a spring 28, e.g. a helical pressure spring, which is arranged around the first end 22 of the actuator shaft 21 such that the opposite ends of the spring 28 are in contact with the housing 1 and the knob 27 respectively.

When no external forces acts in axial direction on the actuator shaft 21, the force from spring forces the locking teeth 43 into engagement with the locking notches 2 and the actuator shaft 21 is prevented from turning. When the trough 6 for grinding liquid should be raised or lowered, the knob 27 is pushed towards the housing 1 of the grinding machine. This causes the locking teeth 43 on the actuator shaft 21 to slide out of engagement with the locking notches 42 on the locking sleeve 42 and the actuator shaft 21 may be turned.

FIG. 5 shows the grinding machine 100 in a grinding position in which the trough 6 for grinding liquid is raised such that the grindstone 4 is contacting the grinding liquid (not shown) in the trough. FIG. 6 shows the grinding machine 100 in a mounting position in which the trough 6 for grinding liquid is lowered towards the base 2 such that the grindstone 4 is free of contact with the grinding liquid in the trough. In this position the trough 6 may be removed from the trough holder 10.

Although a particular embodiment has been disclosed in detail this has been done for purpose of illustration only, and is not intended to be limiting. In particular it is contemplated that various substitutions, alterations and modifications may be made within the scope of the appended claims. For example, the lifting/lowering arrangement may be realized with first and second coupling means in the form of friction surfaces instead of intermeshing teeth. It is also possible to include further coupling means, such as linkages, in the lifting/lowering arrangement.

Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

The invention claimed is:

1. A grinding machine comprising a housing having a base for supporting the grinding machine, a shaft for holding a grindstone, a motor for rotating the shaft and a trough holder for holding a trough for grinding liquid, the trough holder being arranged below the shaft, wherein the trough holder is movable in a vertical direction between the base of the housing and the shaft for holding the grindstone and that the grinding machine comprises a lifting/lowering arrangement for moving the trough holder in said vertical direction, wherein the trough holder is configured to be guided in a vertical slot in the housing of the grinding machine, and wherein the vertical slot extends along an axis extending from the base of the grinding machine through the shaft for holding the grindstone.

2. The grinding machine according to claim 1, wherein the lifting/lowering arrangement comprises:
   an actuator having a first coupling means; and
   a second coupling means arranged on the trough holder, wherein the first coupling means and the second coupling means are configured to couple the actuator and the trough holder such that actuation of the actuator causes the trough holder to move in the vertical direction.

3. The grinding machine according to claim 2, wherein the first coupling means and the second coupling means comprises intermeshing gears.

4. The grinding machine according to claim 3, wherein the first coupling means is a gear wheel and the second coupling means is a toothed rack.

5. The grinding machine according to claim 2, wherein the second coupling means is arranged on an internal side surface of the trough holder.

6. The grinding machine according to claim 2, wherein the actuator is an actuator shaft having a first end and a second end, wherein the first end and the second end are journalled in the housing of the grinding machine, wherein the first end of the actuator shaft is arranged to be manually turned by an operator of the grinding machine, and wherein the second end of the actuator shaft comprises said first coupling means.

7. The grinding machine according to claim 6, further comprising a locking arrangement for locking the actuator shaft from rotating, wherein the locking arrangement comprises:
   a locking sleeve, comprising at least one locking notch; and at least one locking tooth arranged on the actuator shaft, wherein the locking sleeve is attached to the housing of the grinding machine and surrounds a portion of the actuator shaft, and wherein the actuator shaft is slidable in an axial direction such that the at least one locking tooth may engage and/or disengage the at least one locking notch on the locking sleeve.

8. The grinding machine according to claim 1, wherein the trough holder comprises at least one support arm for supporting the trough for grinding liquid, said at least one support arm extending from an external side surface of the trough holder.

9. The grinding machine according to claim 8, wherein the external side surface of the trough holder comprises a yoke, wherein a first support arm extends from a first end of the yoke and a second support arm extends from a second end of the yoke.

10. A grinding machine comprising a housing having a base for supporting the grinding machine, a shaft for holding a grindstone, a motor for rotating the shaft and a trough holder for holding a trough for grinding liquid, the trough holder being arranged below the shaft, wherein the trough holder is movable in a vertical direction between the base of the housing and the shaft for holding the grindstone and that the grinding machine comprises a lifting/lowering arrangement for moving the trough holder in said vertical direction, wherein the lifting/lowering arrangement comprises:

an actuator having a first coupling means; and a second coupling means arranged on the trough holder, wherein the first coupling means and the second coupling means are configured to couple the actuator and the trough holder such that actuation of the actuator causes the trough holder to move in the vertical direction, wherein the actuator is an actuator shaft having a first end and a second end, wherein the first end and the second end are journalled in the housing of the grinding machine, wherein the first end of the actuator shaft is arranged to be manually turned by an operator of the grinding machine, and wherein the second end of the actuator shaft comprises said first coupling means, and further comprising a locking arrangement for locking the actuator shaft from rotating, wherein the locking arrangement comprises: a locking sleeve, comprising at least one locking notch; and at least one locking tooth arranged on the actuator shaft, wherein the locking sleeve is attached to the housing of the grinding machine and surrounds a portion of the actuator shaft, and wherein the actuator shaft is slidable in an axial direction such that the at least one locking tooth may engage and/or disengage the at least one locking notch on the locking sleeve.

\* \* \* \* \*